Jan. 5, 1932.  S. S. BEMAN  1,839,461
HEATING APPARATUS
Filed June 4, 1928   2 Sheets-Sheet 1
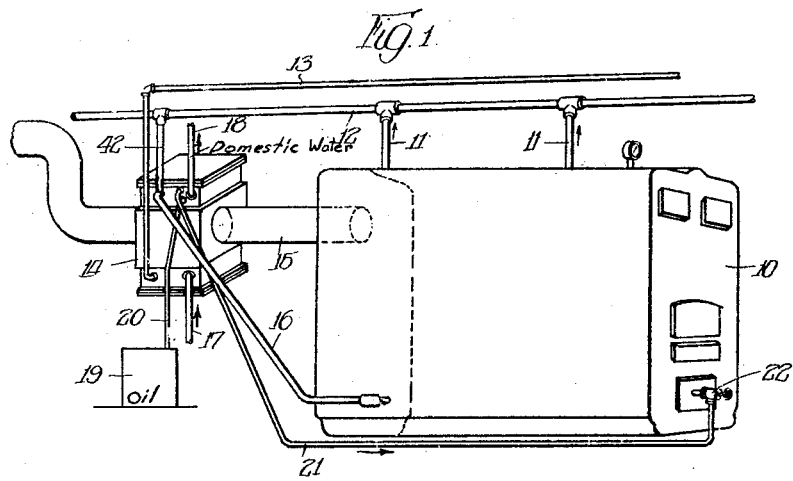
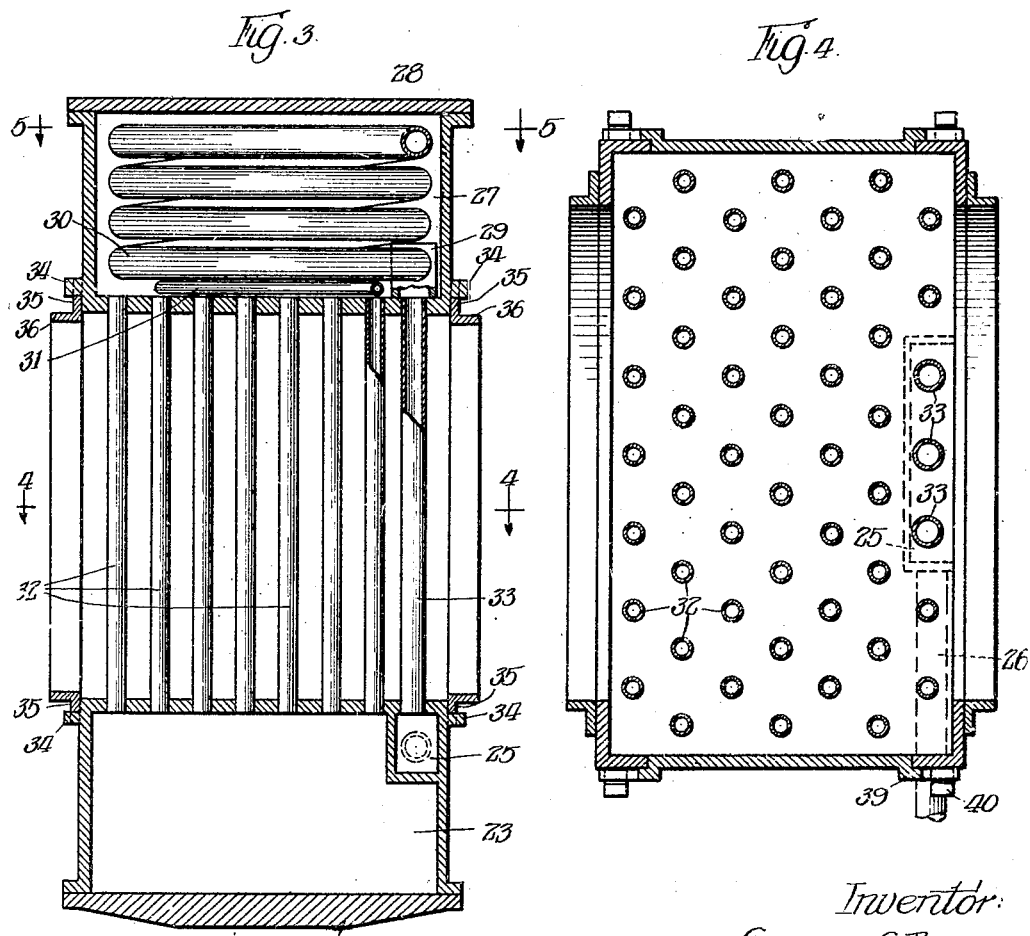

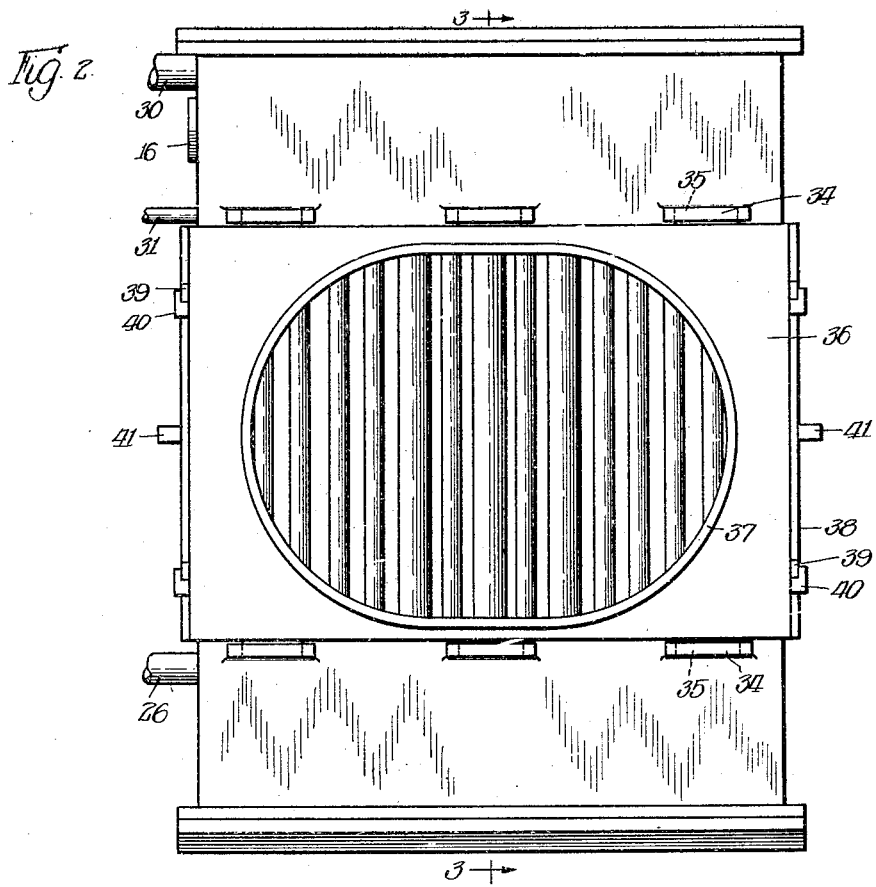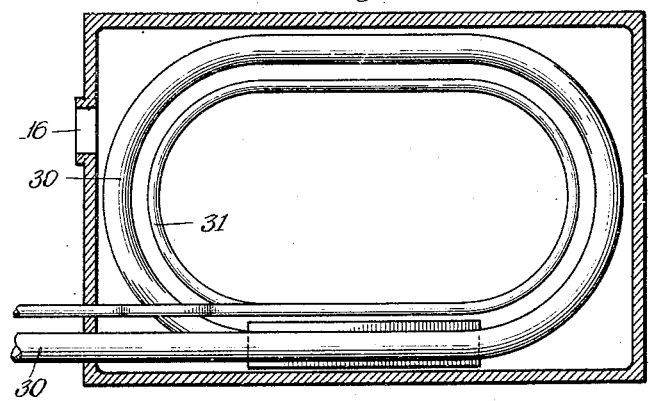

Patented Jan. 5, 1932

1,839,461

UNITED STATES PATENT OFFICE

SPENCER S. BEMAN, OF WINNETKA, ILLINOIS

HEATING APPARATUS

Application filed June 4, 1928. Serial No. 282,553.

This invention pertains to heating apparatus, and more particularly to preheaters for fluid used in generating plants and the like whereby fluid for the operation thereof is introduced to said plants at an initial raised temperature.

Many of the boiler systems and the like now in use are so-called oil burners, this type of fuel being used in the heating of the water contained in the system for different uses throughout the entire system, and it is frequently necessary to supply said boilers with replacement water, and where such is done, it is very undesirable to introduce cold water into the already heated water or steam space as naturally that reduces the efficiency of the boiler, requiring a much longer period to heat the water sufficiently to introduce it for circulation into the remainder of the system with consequent heat losses. This is likewise true in heating systems where the heated fluid has been circulated through the system and is returned to the boiler for reheating, it being undesirable that under severe operating conditions or where the system is large, the returned fluid will be in a comparatively cold condition. Similarly, where an oil burning system is in operation, it is oftentimes necessary and desirable to heat the oil to properly supply it to the oil burner as the oil used in such system is of an expensive grade and consequently quite viscous, and for the proper combustion of the oil in many of the burners now in use, the oil must be atomized at the burner tip to support proper ignition. In many of the heating systems, especially for household use, separate heaters are provided for the domestic water, the operation of said heaters being intermittent, requiring some time to heat the water supplied through the system, or the heaters may be of constant operation, but in either case, additional expense must be incurred in heating this domestic water.

It is therefore an object of this invention to provide a preheater for boilers whereby the fluid supplied thereto is introduced at an initial raised temperature.

Another object is to provide a device utilizing waste heat to preheat fluid supplied to the boilers and to provide a device readily applied to a heating system to thereby increase the efficiency thereof and to fulfill all requirements of manufacture and service.

Still another object is to provide a device readily applied to or built in a heating system, which device requires no moving parts or radical departures or alterations in or from existing systems.

A further object is to provide a device for heating a plurality of fluids in a system, such as, for example, the domestic water, the supply water to the boilers, and the fuel to the boiler heating apparatus, and one which requires no continued expense for the proper operation thereof.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a more or less diagrammatic elevation of a heating system embodying the invention;

Figure 2 is a front elevation of the assembled preheating device;

Figure 3 is a sectional side elevation of the preheating device, certain parts being broken away, the same being taken substantially in the plane as indicated by the line 3—3 of Figure 2;

Figure 4 is a top sectional plan view of the heating device, the same being taken substantially in the plane as indicated by the line 4—4 of Figure 3; and Figure 5 is a top sectional plan view of the preheating device, the same being taken substantially in the plane as indicated by the line 5—5 of Figure 3.

Referring first of all to the system illustrated in Figure 1, the boiler furnace 10 is illustrated as one adapted to heat fluid for circulation through a heating system, and the boiler space is therefore connected through piping 11 to a supply pipe 12 whereby the fluid flows from the boiler space through the pipes 11 and 12, through the system and returns through return pipe 13 (of any convenient number, one shown), said pipe being directly connected to a lower water jacket or reservoir of the preheating device 14, said preheating device being associated with or forming a part of the boiler flue 15.

The water in the heating system, entering the lower part of the device 14 through pipe 13, circulates through said device in a manner to be more particularly described, being drawn off from a point adjacent the top thereof and returned through piping 16 to a point in the boiler preferably materially below the outlets to pipes 11 to thereby complete the system. As will readily be appreciated, the preheating device is adapted to utilize the ordinarily wasted heat which is drawn off from the boiler through the flue 15, it being found desirable to form the device in such a manner that the ordinarily wasted heat passes completely through the device.

The water for domestic use may be made to enter the reservoir of the preheating device through pipe 17 where it circulates through said device, being drawn off adjacent the top thereof and supplied to the remainder of the domestic system through pipe 18. The boiler illustrated is of the oil burning type and the oil may be supplied in any convenient manner from the oil reservoir 19 through pipe 20 to the upper portion or dome of the preheating device where it is circulated therein and is drawn off from a higher point than that introduced through the pipe connection 21, through which it is conveyed to the burner 22.

Referring now more particularly to the preheating device per se, illustrated in Figures 2 to 5 inclusive, the device consists essentially of a lower portion or reservoir 23 of any convenient size and preferably provided with a removable base plate 24 to facilitate assemblage of the device. This reservoir is provided with a manifold 25 preferably disposed adjacent the top and side of said reservoir and being of comparatively small size and closed with respect to said reservoir. This manifold may be connected through pipe connection 26 to the intake 17 of the domestic water system. The upper portion or dome 27 is preferably provided with a removable cover member 28 and is provided with a manifold 29 adapted to be similarly placed in said dome to correspond with the manifold 25 in the reservoir, being of substantially the same size as said manifold 25 and closed with respect to the dome. The manifold 29 is provided with a fitting 30 comprising a substantially helical coil of piping, the same extending from said manifold to a point adjacent the top of the dome where it may be connected to the domestic supply line 18 for the domestic system.

The supply line 20 from the oil reservoir 19 may be connected to the fuel oil heating coil 31, entering the dome adjacent the bottom thereof, (Figure 2), extending into said dome where it is disposed in substantially helical formation within the confines of the helical coil 30 and is connected to the fuel pipe 21 adjacent the top of said manifold. The manifold and dome are positioned in spaced relation and are connected by means of a series of pipe connections 32, rows of said pipe connections through the depth of the device being preferably disposed in staggered relation, as clearly indicated in Figure 4. The manifolds 25 and 29 are also connected by pipe connections 33 to permit circulation through said manifolds. Both the reservoir and the dome are provided with suitably disposed lugs 34, the same being adapted to accommodate lugs 35 on flue plates 36, said flue plates being provided with openings 37 properly flanged to accommodate the flue 15 so as to provide passage through the preheating device to the flue directly connected to the chimney or exhaust.

The assembly is completed by side plates 38 provided with lugs 39 adapted to be accommodated in lugs 40 on the dome and reservoir, handles 41 being provided in these side plates to facilitate their disposition.

From the construction illustrated, it will be appreciated that the device may be readily assembled by removing the bottom and top plates 24 and 28 of the reservoir and manifold, applying the flue plates 36 and the side plates 38 in their proper relation, supporting the same by means of the lugs 34, 35, and 39 and 40, at which time the pipe connections 33 and 32 may be applied to aligned apertures in the manifolds 25 and 29 and in the reservoir and dome. The helical coils or piping 30 and 31 may then be properly positioned in the dome of the device, after which the bottom and top plates 24 and 28 may be secured in place, at which time the device is ready for application to the flue 15 and the respective piping connections to complete the system.

There is an added advantage attained by connecting the dome to the system pipe 12, such as by vent pipe 42 in that water circulated through the system is given initial actuation, and air or steam is prevented from being trapped in said dome. In operation then, it is possible for the system water to initially be heated by the normally waste heat by circulating through pipe 13, through the preheating device, up through the vent 42 and through pipe 12 without going through the water in the boiler which is being heated. When the boiler water has been heated and starts circulating, then the greatest part of the water in the heating system flows from pipe 13, through the preheating device, through pipe 16 to the boiler, through the boiler and finally up through pipe 11 to pipe 12, and so on through the system, all as before described.

It will be further appreciated that devices of this character are limited as to size, due to the fact that they are to be associated particularly with domestic furnaces, yet at the same time, in order to be effective, they must have the proper number and spacing of tubes 32 to permit proper and ready passage of exhaust gases through the off-take flue 15. They must also have a small domestic water reservoir in the spaced portions 23 and 27, yet must have a sufficiently large heating surface to properly function, so that the usual heating devices for domestic water may be discarded or at least only used as an auxiliary heater. The connections 33 must be of sufficient capacity to permit ready flow, as also the connections 32, yet must not check the exhaust gases. It will also be appreciated that the number of tubes 33 are very limited due to the fact that a proper and relatively larger number of tubes 32 are necessary to permit sufficient flow of the fluid in the heating system from the portion 23 to portion 27 for the proper accommodation of the fluid in the main heating line. And it follows that the expedient of using coil 30 as additional heating means for the domestic fluid is resorted to as an attachment to manifold 29. Further the device must be inexpensive to make and maintain. All these applicant has accomplished with the device of the character described in the claims and referred to in the specification.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a device of the character described, the combination of a heat conducting member, fluid containing means associated therewith, said means having fluid receiving members extending within said heat conducting member, manifolds, substantially entirely within said means, and connections between manifolds extending within said heat conducting member.

2. In a device of the character described, the combination of a heat conducting member, fluid containing means associated therewith, said means having fluid receiving members extending within said heat conducting member, manifolds substantially entirely within said means, connections between manifolds extending within said heat conducting member, and fluid conducting means connected to one of said manifolds and disposed in one of said fluid containing means.

3. In a device of the character described, the combination of fluid conducting means, a fluid reservoir and a fluid dome associated with said means, said dome being located above said reservoir, connections between said reservoir and dome, fluid manifolds disposed substantially entirely within said dome reservoir respectively and having connections therebetween disposed within said fluid conducting means, and a connection from one of said manifolds disposed within said dome.

4. In a device of the character described, the combination of spaced reservoirs, means associated therewith to form a fluid passage therebetween whereby a change of temperature may be imparted to said reservoirs, connections between reservoirs extending through said passage whereby fluid may be circulated from one reservoir to another, a manifold in one of said reservoirs having an inlet connection thereto, a manifold in the other of said reservoirs, said last named manifold having fluid conducting means associated therewith and disposed in said other reservoir for conducting fluid through said other reservoir from said manifold, connections between manifolds, whereby fluid of said manifolds is subjected to the change of temperature of the fluid in said reservoirs.

5. In a device of the character described, the combination of reservoirs, casing members positioning said reservoirs in spaced relation to each other and forming a passage between said reservoirs for conducting heating medium through the device, connecting means forming communication between reservoirs, a manifold non-communicatively carried by each of said reservoirs, said manifolds being in communication with each other, fluid conducting means connected to one of said manifolds and disposed in its respective reservoir, and means for containing fluid disposed in one of said reservoirs for heating the fluid carried in said means.

6. In a device of the character described, the combination of reservoirs, casing members positioning said reservoirs in spaced relation to each other and forming a passage between said reservoirs for conducting heating medium through the device, connecting means extending through said passage for forming communication between reservoirs, manifolds closed to said reservoirs carried therein, a fluid inlet to one of said manifolds, connections between manifolds disposed in said passage, and a fluid outlet from the other manifold having a portion disposed in its respective reservoir to provide additional heating surface for the fluid conducted thereby.

7. In a device of the character described, the combination of reservoirs, casing members positioning said reservoirs in spaced relation to each other and forming a passage between said reservoirs for conducting heating medium through the device, connecting means disposed in staggered formation to each other extending through said passage for forming communication between reservoirs, manifolds closed to said reservoirs carried therein, a fluid inlet to one of said manifolds, connections between manifolds disposed in said passage, and a fluid outlet from the other manifold having a substantially helical portion disposed in its respective reservoir to provide additional heating surface for the fluid conducted thereby.

8. In a device of the character described, the combination of reservoirs, casing members positioning said reservoirs in spaced relation to each other and forming a passage between said reservoirs for conducting heating medium through the device, connecting means disposed in staggered formation to each other extending through said passage for forming communication between reservoirs, manifolds closed to said reservoirs carried therein, a fluid inlet to one of said manifolds, connections between manifolds disposed in said passage, a fluid outlet from the other manifold having a substantially helical portion disposed in its respective reservoir to provide additional heating surface for the fluid conducted thereby, and helical fluid conducting means disposed in one of said reservoirs for providing heating means for fluid circulated in said conducting means.

9. In a device of the character described, the combination of reservoirs, casing members positioning said reservoirs in spaced relation to each other and forming a passage between said reservoirs for conducting heating medium through the device, connecting means disposed in staggered formation to each other extending through said passage for forming communication between reservoirs, manifolds closed to said reservoirs carried therein, a fluid inlet to one of said manifolds, connections between manifolds disposed in said passage, a fluid outlet from the other manifold having a substantially helical portion disposed in its respective reservoir to provide additional heating surface for the fluid conducted thereby, and helical fluid conducting means disposed in one of said reservoirs and within said helical portion for providing heating means for fluid circulated in said conducting means.

10. In a device of the character described, the combination of a reservoir and a dome, casing members positioning said reservoir and dome in spaced relation to each other, said dome being above said reservoir to thereby form a passage between said reservoir and dome for conducting heating medium through the device, connecting means extending through said passage disposed in staggered formation to each other to form communication between said reservoir and dome, manifolds closed to said reservoir and dome and carried therein, a fluid inlet to the manifold in said reservoir, connections between manifolds disposed in said passage, and a helical outlet from the manifold in said dome disposed in said dome.

11. In a device of the character described, the combination of a reservoir and a dome, casing members positioning said reservoir and dome in spaced relation to each other, said dome being above said reservoir to thereby form a passage between said reservoir and dome for conducting heating medium through the device, connecting means extending through said passage disposed in staggered formation to each other to form communication between said reservoir and dome, manifolds closed to said reservoir and dome and carried therein, a fluid inlet to the manifold in said reservoir, connections between manifolds disposed in said passage, a helical outlet from the manifold in said dome disposed in said dome, and helical fluid conducting means disposed in said dome and within the confines of said helical outlet.

12. In a heater, the combination of a fluid receiving chamber having an inlet and an outlet and associated with heating means for heating the fluid passing through said chamber, fluid receiving means disposed in said chamber adjacent said heating means and having an inlet and an outlet, said fluid receiving means being constructed and arranged to be supplied with fluid to be heated as it passes through said means by the fluid in said first named chamber and said heating means.

13. A heating device having spaced fluid receiving portions formed to provide a heat conducting passage therebetween, one of said spaced portions having a fluid entrance, the other of said spaced portions having a fluid exit, means extending through said passage for conducting fluid from one spaced portion to the other, said means being subjected to the heat passing through said passage, and a fluid receiving housing disposed in each of said spaced portions and connected by means extending through said passage whereby fluid passing through said last named means is subjected to the heat passing through said passage, one of said fluid receiving housings having an entrance and the other of said housings having an extended fluid conducting member connected to a fluid exit from said device, said extended member being disposed in the respective spaced portion containing said last named housing whereby the fluid passing through said housings is subjected to the heat of the fluid passing through said spaced portions.

14. In a heating device, the combination of spaced fluid receiving portions disposed to form a passage therebetween to receive heat from an off-take flue or the like, connections between said portions disposed in said passage whereby the fluid passing from one portion to the other is subjected to the heat in said passage, manifolds disposed in said portions for receiving different fluid, connections between said manifolds extending through said passage, said manifolds being subjected to the heat of the fluid in said portions from a plurality of directions, and an elongated conducting member extending from one of said manifolds and coiled in one of said portions, whereby the fluid passing from said manifolds and through said elongated conducting member is additionally heated by the fluid in said portions.

15. In a heating device, the combination of spaced fluid receiving portions disposed to form a passage therebetween to receive heat from an off-take flue or the like, connections between said portions disposed in staggered relation to each other in said passage and substantially throughout the length thereof whereby the fluid passing from one portion to the other is subjected to the heat in said passage, manifolds disposed in said portions for receiving different fluid, connections between said manifolds extending through said passage and in staggered relation to said other connections, said manifolds being subjected to the heat of the fluid in said portions from a plurality of directions, and an elongated conducting member extending from one of said manifolds and coiled in one of said portions, whereby the fluid passing from said manifolds and through said elongated conducting member is additionally heated by the fluid in said portions.

16. In a heating system the combination of a heat generating device having an off-take flue, a main heating line supplied with heated fluid from said device, a preheating device interposed in and associated with said off-take flue for receiving heat therefrom, said preheating device including spaced fluid receiving portions, the walls of which are so positioned as to receive heat from said off-take flue, connections between said portions disposed in the off-take flue, said connections being disposed to permit ready flow through said flue and of sufficient capacity to permit ready flow from one portion to the other, a return from said line to one of said portions, a connection from the other of said portions to said generating device whereby preheated fluid is supplied thereto, a manifold entirely within said first named portion and disposed to receive heat from the fluid therein from a plurality of directions, a different fluid connection to said manifold, elongated conducting means disposed in said second named portion for receiving additional heat therefrom connected to said manifold through connections extending through said flue, and a connection between said elongated means and an external connection.

17. In a heating system the combination of a heat generating device having an off-take flue, a main heating line supplied with heated fluid from said device, a preheating device interposed in and associated with said off-take flue for receiving heat therefrom, said preheating device including spaced fluid receiving portions, the walls of which are so positioned as to receive heat from said off-take flue, connections between said portions disposed in the off-take flue, said connections being disposed to permit ready flow through said flue and of sufficient capacity to permit ready flow from one portion to the other, a return from said line to one of said portions, a connection from the other of said portions to said generating device whereby preheated fluid is supplied thereto, a manifold entirely within said first named portion and disposed to receive heat from the fluid therein from a plurality of directions, a different fluid connection to said manifold, elongated conducting means disposed in said second named portion for receiving additional heat therefrom connected to said manifold through connections extending through said flue, and a connection between said elongated means and an external connection, a burner for said generating device, a source of fluid fuel supply therefor, a connection between said source of supply and said burner, said connection extending through an elongated conducting member in said second named portion whereby said fuel is heated by the fluid in said portion.

Signed at Chicago, Illinois, this 1st day of June, 1928.

SPENCER S. BEMAN.